(12) United States Patent
Kaehler

(10) Patent No.: US 9,251,407 B2
(45) Date of Patent: *Feb. 2, 2016

(54) SECURITY SYSTEM UTILIZING GESTURE RECOGNITION

(75) Inventor: Adrian Kaehler, Boulder Creek, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 2159 days.

This patent is subject to a terminal disclaimer.

(21) Appl. No.: 12/204,509

(22) Filed: Sep. 4, 2008

(65) Prior Publication Data

US 2010/0052851 A1 Mar. 4, 2010

(51) Int. Cl.

| | |
|---|---|
| *G05B 19/00* | (2006.01) |
| *G06K 9/00* | (2006.01) |
| *G06F 3/01* | (2006.01) |
| *G06F 3/0488* | (2013.01) |
| *G06F 21/31* | (2013.01) |
| *G06F 21/32* | (2013.01) |
| *G06F 21/83* | (2013.01) |
| *H04L 29/06* | (2006.01) |

(52) U.S. Cl.
CPC ............ *G06K 9/00335* (2013.01); *G06F 3/017* (2013.01); *G06F 3/04883* (2013.01); *G06F 21/316* (2013.01); *G06F 21/32* (2013.01); *G06F 21/83* (2013.01); *G06K 9/00154* (2013.01); *H04L 63/0861* (2013.01); *G06F 2221/2101* (2013.01)

(58) Field of Classification Search
USPC ................ 340/5.2, 5.4, 5.51–5.53, 5.7–5.74, 340/5.8–5.85; 382/115–127, 154, 186, 187, 382/195, 229
See application file for complete search history.

(56) References Cited

U.S. PATENT DOCUMENTS

| | | | |
|---|---|---|---|
| 4,975,975 | A | 12/1990 | Filipski |
| 5,596,656 | A | 1/1997 | Goldberg |
| 5,680,470 | A | 10/1997 | Moussa et al. |

(Continued)

FOREIGN PATENT DOCUMENTS

WO   WO 2005/114556 A2   12/2005

OTHER PUBLICATIONS

U.S. Patent Kaehler U.S. Appl. No. 12/199,609, filed Aug. 27, 2008 for: "*System and Method for Single Stroke Character Recognition*".

(Continued)

*Primary Examiner* — Andrew Bee
(74) *Attorney, Agent, or Firm* — Tarolli, Sundheim, Covell & Tummino LLP

(57) ABSTRACT

Systems and methods are provided for restricting access to an item of interest. A normalization component resamples an input trajectory to produce a resampled trajectory having a standard size. A reference point generator reduces the resampled trajectory to respective values for a set of reference points, each having at least two associated coordinates. The system further includes at least one authentication region. Each of the at least one authentication region represents at least one of the set of reference points. A verification component is configured to determine if the values for the set of reference points from a given input falls within the at least one authentication region. An access restriction mechanism restricts access to the item of interest unless a threshold number of values for the set of reference points from the input falls within their associated authentication regions.

19 Claims, 5 Drawing Sheets

(56) References Cited

U.S. PATENT DOCUMENTS

| | | | |
|---|---|---|---|
| 5,684,892 A | | 11/1997 | Taguchi |
| 6,421,453 B1* | | 7/2002 | Kanevsky et al. ............ 382/115 |
| 6,636,631 B2 | | 10/2003 | Miyazaki et al. |
| 6,816,632 B1 | | 11/2004 | Slice |
| 7,225,107 B2* | | 5/2007 | Buxton et al. ................ 702/183 |
| 2005/0190973 A1 | | 9/2005 | Kristensson et al. |
| 2006/0039587 A1* | | 2/2006 | Yoon et al. .................... 382/115 |
| 2006/0253793 A1* | | 11/2006 | Zhai et al. ...................... 715/773 |
| 2007/0041058 A1 | | 2/2007 | Disatnik et al. |
| 2008/0080789 A1 | | 4/2008 | Marks et al. |

OTHER PUBLICATIONS

European Search Report for corresponding EP 09 01 1390, dated Feb. 28, 2012, completed by Anton Versluis of The Hague.

Faundez-Zanuy, et al.: "*On-line Signature Recognition Based on VQ-DTW*"; Pattern Recognition, Elsevier, GB, vol. 40, No. 3, Nov. 6, 2006, 981-992, XP005732819, ISSN: 0031-3203, DOI: 10.1016/J. Patcog; abstract, p. 985, col. 2, third sentence, 1.2, 2, 2.2.2, 2.4, Figs. 1-2 and 7-8.

Faundez-Zanuy, et al.: "*Signature Recognition State-of-the-Art*", IEEE Aerospace and Electronic Systems Magazine, IEEE Service Center, Piscataway, NJ, US, vol. 20, No. 7, Jul. 1, 2005, pp. 28-32, XP011138277, ISSN: 0885-8985, DOI: 10.1109/MAES.2005. 1499249; 2-4 and Fig. 4.

Hsu et al.: "*Motion Trajectory Based Video Indexing and Retrieval*"; International Conference on Image Processing (ICIP), vol. 1, Sep. 22, 2002, pp. 605-608, XP010607396, DOI: 10.109/ICIP.2002.1038096, ISBN: 978-0-7803-7622-9; abstract, 3.3, 4, 4.1.1, 4.1.2, 4.4.1.

Sayeed et al.: "*Virtual Reality Based Dynamic Signature Verification Using Data Glove*"; Intelligent and Advanced Systems, 2007. ICIAS 2007. International Conference on, IEEE, Piscataway, NJ, USA, Nov. 25, 2007, pp. 1260-1264, XP031397753, ISBN: 978-1-4244-1355-3; abstract, II,III, III.F, (specifically eq. 6).

Sayeed, et al.: "*Enhancement of Glove-Based Approach to Dynamic Signature Verification by Reducing No. of Sensors*"; Information Technology, 2008, ITSIM 2008,. International Symposium on, IEEE, Piscataway, NJ, USA, Aug. 26, 2008, pp. 1-9, XP031325876, ISBN: 978-1-4244-2327-9; abstract, 2.4.

IBM Technical Disclosure Bulletin: "*Method for Access Control Via Gestural Verification*"; International Business Machines Corp. (Thorwood), US, vol. 36, No. 9B, Sep. 1, 1993, pp. 487-488, XP000397236, ISSN: 0018-8689.

* cited by examiner

US 9,251,407 B2

SECURITY SYSTEM UTILIZING GESTURE RECOGNITION

TECHNICAL FIELD

The present invention relates to security systems and, more particularly, to a security system utilizing gesture recognition.

BACKGROUND OF THE INVENTION

The problem of restricting access to a particular item to one or more authorized users has existed for centuries, and over this time, a number of methods have been developed for securing an item of interest from unauthorized users. The most widely used approach is the use of mechanical or electronic locks that can be released via a key or key card. A drawback of relying on keys and key cards to establish a user's identity is the necessity for a user to carry an object at any time in which the item of interest must be accessed, making it more difficult to access the secured item on demand. Many computer systems and financial accounts utilize passwords or PIN (Personal Identification Number) to authenticate a user, but these systems are subject to the vagaries of human memory and can be compromised through a number of means, including brute force decryption attacks, malware keyloggers hidden in a computer system, the selection of a trivial or weak password or PIN by a user, and social engineering. More secure systems may utilizing biometric approaches to authenticating a user, such as scanning a thumbprint, but effective biometric systems tend to be costly to implement, and so far, these systems have not been widely adopted.

SUMMARY OF THE INVENTION

In accordance with one aspect of the present invention, a security system is provided for securing an item of interest. A gesture input interface is configured to convert a continuous gesture from a user into an input trajectory. A normalization component is configured to resample the input trajectory to produce a resampled trajectory having a standard size. A reference point generator is configured to reduce the resampled trajectory to respective values for a set of reference points. Each of the values for the set of reference points has at least two associated coordinates. The system further includes at least one authentication region. Each of the at least one authentication region represents at least one of the set of reference points, such that each authentication region is defined within a multidimensional feature space having dimensions corresponding to the at least two coordinates associated with each of the at least one points associated with the authentication region from respective sets of representative statistics for the at least one reference point represented by the authentication region. A verification component is configured to determine if the values for the set of reference points from a given input falls within the at least one authentication region. An access restriction mechanism is configured to restrict access to the item of interest unless a threshold number of values for the set of reference points from the input falls within their associated authentication regions.

In accordance with another aspect of the present invention, a method is provided for training a gesture based security system. A plurality of input trajectories representing a characteristic gesture for the user are generated. The plurality of input trajectories are normalized to produce a set of normalized trajectories having a standard set of dimensions. Each normalized trajectory is reduced to a standard set of substantially evenly spaced reference points, with each reference point having at least two associated coordinates. Representative statistics are calculated for each of the reference spaced points across the plurality of input trajectories, including a mean for each of the at least two associated coordinates associated with the point, a variance for each of the at least two associated coordinates, and a covariance between at least a first of the at least two coordinates and a second of the at least two coordinates. Respective authentication regions are defined in at least one feature space defined by the associated coordinates of the set of reference points as an authentication range for inputs from the user. The respective authentication regions for the at least one feature space each have at least one associated point from the set of reference points and are defined according to the mean for each of the at least two associated coordinates associated with each of the at least one associated point, a variance for each of the at least two associated coordinates associated with each of the at least one associated point, and a covariance between at least a first of the at least two coordinates and a second of the at least two coordinates associated with each of the at least one associated point.

In accordance with yet another aspect of the present invention, a security system is provided for controlling access to an item of interest. An input device is configured to a gesture by a user into a trajectory representing a motion of the user over time. A normalization component is configured to resample the trajectory to produce a resampled trajectory having a standard size. A reference point generator is configured to define a standard number of substantially equidistant reference points on the resampled trajectory, with each of the reference points having at least two associated coordinate values. A parameter calculation component is configured to calculate representative statistics across a plurality of gestures from a user for the reference points. The representative statistics comprising at least one covariance value between a first coordinate and a second coordinate associated with one of the reference points. Each of at least one authentication region represents at least one of the set of reference points, such that each authentication region is defined within a multidimensional feature space having dimensions corresponding to the at least two coordinates associated with each of the at least one points associated with the authentication region according to the representative statistics for the reference points associated with the authentication. A verification component is configured to determine if the coordinate values for the set of reference points from a given input fall within the at least one authentication region.

DETAILED DESCRIPTION OF INVENTION

The present invention relates to security systems for restricting access to an item of interest. The phrase "item of interest" is intended to be applied broadly herein, and can encompass, for example, any of a computing device, an entryway to a building or room, and an access point (e.g., a drawer, a door, a panel, or a lid) for a storage unit such as a cabinet, a lock box, a safe, an encryption key, a document, a digital signature file, or an account, such as a bank account, a credit/debit card account, an e-mail account, or a user account for a computer system. In accordance with an aspect of the present invention, a pattern recognition system can be trained with a plurality of input gestures from an authorized user. Each of these inputs can be normalized and reduced to a number of representative points, and representative statistics can be calculated, representing the mean, variance, and covariance of the coordinates defining the normalized position of the points across the plurality of inputs. From this data, it is possible to characterize not only the expected position of each point for a given input from the authorized user, but also the tendency of the user to deviate from the expected positions in a particular manner. Accordingly, the likelihood that a given gesture was performed by an authorized user can be determined with substantial precision, facilitating the identification and rejection of unauthorized users of the system.

Figure 1:
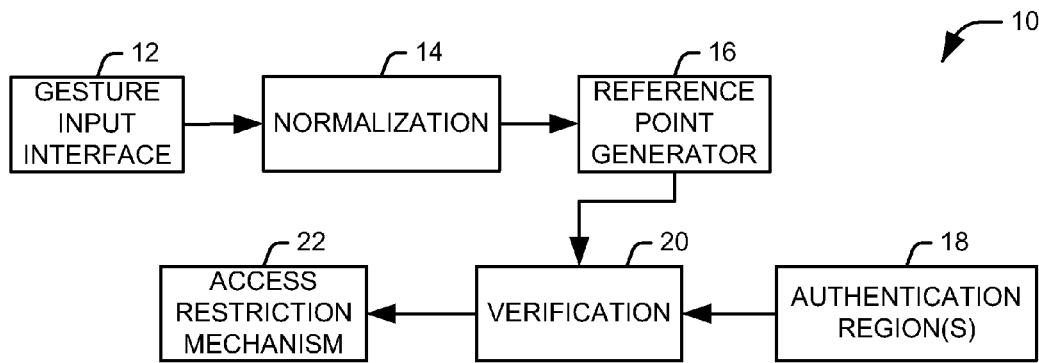
FIG. 1 illustrates a security system utilizing gesture recognition in accordance with an aspect of the present invention.

FIG. 1 illustrates a security system 10 for restricting access to an item of interest that utilizes gesture recognition in accordance with an aspect of the present invention. It will be appreciated that by a "gesture," it is meant to include any movement by a input object, such as a portion of a user's body (e.g., a limb or digit) or a tool (e.g., a stylus or computer mouse), manipulated by a user that is measured from a designated starting point (e.g., the point in which a stylus is placed on the screen, the point at which a digit is inserted into a region monitored by infrared cameras, etc.), to a designated ending point. Each authorized user of the system 10 can have an associated characteristic gesture that is recognized by the system. The characteristic gesture can include any continuous two or three dimensional motion by the user that can be recognized by an appropriate interface and reduced to a digital trajectory. For example, the gesture can include all or a portion of a signature, the tracing of an arbitrary character, or any other continuous motion.

The system 10 includes a gesture input interface 12 that reduces a gesture made by a user into a trajectory defined by a continuous line of points. For example, the gesture input interface 12 can include a touch screen and appropriate software for tracking the position of a stylus on the touch screen. Alternatively, the gesture input interface 12 can include an arrangement of one or more cameras operating in the visible or infrared spectra that track the movement of a user within a designated region. In another implementation, the gesture input device 12 could include a mouse or a similar device, with a click of the mouse indicating the designated starting and ending points.

The trajectory produced by the gesture input interface 12 is provided to a normalization component 14. The normalization component 14 is configured to resample the points comprising the trajectory to a standard set of dimensions. For example, the points comprising the trajectory can be resampled via a linear transformation to fit a unit square of standard size. A bounding box can be defined, such that each of a topmost point, a lowermost point, a leftmost point, and a rightmost point in the resampled trajectory is within a predetermined distance of a corresponding boundary of the bounding box, and the contents of the bounding box can be resampled to fit the unit square.

The resampled trajectory can then be provided to a reference point generator 16 that provides values for a standard number of reference points at even intervals along the normalized trajectory. For example, the resampled trajectory can be divided into a number, n+1, of segments having substantially equal length, with the boundary between each pair of segments lying at one of n reference points. Since the number of reference points is constant across trajectories, the difference in the shape of two trajectories can be compared by comparing the relative position of corresponding reference points of the n reference points. The values for each of these reference points include an associated first coordinate and a second coordinate within the unit square, for example, a horizontal and a vertical coordinate. Accordingly, the resampled trajectory can be reduced to n evenly spaced points defined by 2n coordinates, and a given trajectory can be conceptualized as a point in a 2n-dimensional space. The similarity and difference of various trajectories can be quantified as the distance between the points in the defined 2n-dimensional space.

In developing a system in accordance with an aspect of the present invention, it has been determined that a significant degree of correlation can exist between various pairs of the 2n coordinates representing the points for a continuous gesture. For example, in a two-dimensional gesture, it will be appreciated that the horizontal and vertical coordinates of a given point in a trajectory can show an especially high degree of dependence. Accordingly, the assumption of independence between the coordinates, which is substantially accurate in most recognition tasks, does not necessarily hold true for the various coordinates defining the resampled trajectory. In accordance with an aspect of the present invention, the dependence among the coordinates can be accounted for by accounting for at least one covariance term in the analysis of the gesture to account for the impact of the correlated coordinates. The effect of this covariance term can be conceptualized as a stretching or distortion of a region of the 2n-dimensional feature space to account for relatedness of the parameters representing the 2n-dimensional space.

To this end, one or more authentication regions 18 can be developed to represent the likely range of variation of sets of one or more reference points for a given user. Each authentication region is defined within a multidimensional feature space having dimensions corresponding to the coordinates associated with each of one or more points associated with the authentication region. In accordance with an aspect of the present invention, the authentication region can be defined based on one or more representative statistics calculated across a set of training data provided by the user. For example, an authentication region representing a single reference point in a two-dimensional gesture can be defined as an ellipse in two dimensions according to the representative statistics, with a mean value for the two dimensions represented as a centroid of the ellipse, the variance of each coordinate defining the lengths of the axes of the ellipse, and thus the extent of the region in the associated dimensions, and a covariance between the two variables determining an angle of the major axis of the ellipse relative to one of the dimensions. It will be appreciated that as the number of points, and associated coordinates, associated with a given region increases, the representation of the authentication region in feature space becomes increasingly complex, with the extent of the authentication region in each dimension being determined by the variance along a given coordinate and the shape and orientation of the region in the defined feature space being a function of covariance among the various parameters.

A verification component 20 determines if a set of values determined for input reference points fall within the one or more authentication regions. This can be accomplished, for example, via a distance measurement to a mean point of the region, with the distance adjusted to account for the covariances among the various coordinates, or by simply comparing the positions of feature vectors formed from the coordinates associated with the set of points with the boundaries of the one or more authentication regions in their associated feature spaces. For example, the coordinate values for the plurality of reference points can be divided into one or more feature vectors corresponding to the one or more authentication regions, and it can be determined how which of these feature vectors fall within the defined authentication region within its associated feature space. It will be appreciated that for some applications, a user can be authenticated even when less than all of the feature vectors fall within their associated authentication region. The result from the verification component 20 can then be provided to an access restriction mechanism interface 22 that restricts access to the secured item of interest. For example, a doorway or access panel secured by an electronic lock can be unlocked via a digital signal in response to a recognized gesture from an authorized user. Similarly, an encrypted authorization code can be provided to a computer program, stored on either a local or remote computer readable medium, to allow the user access to a computer system, program, or account.

Figure 2:
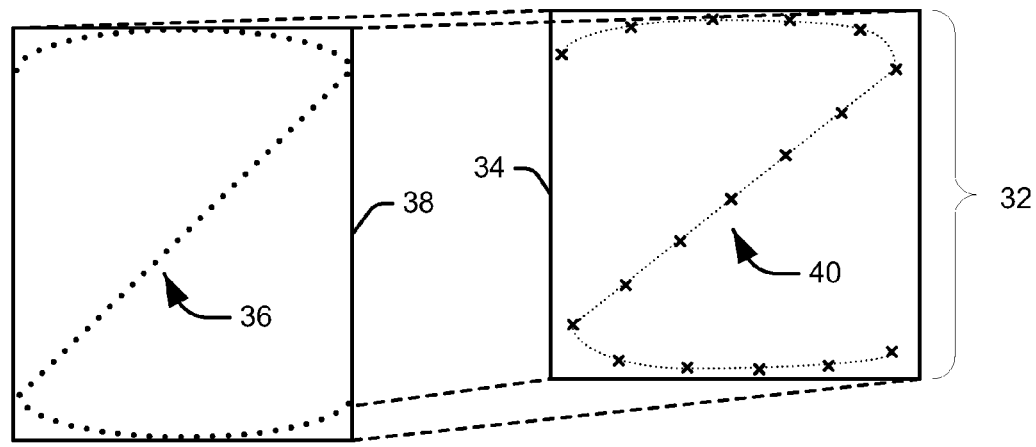
FIG. 2 illustrates the normalization process for producing set of reference points within a unit square from a trajectory captured from a user gesture in accordance with an aspect of the present invention.

FIG. 2 illustrates the normalization process for producing set of reference points 32 within a unit square 34 from a trajectory 36 captured from a user gesture, such as an input from an input object (e.g., a stylus or digit) on a touch screen. After the trajectory 36 is acquired, a bounding box 38 can be defined around the trajectory to define the horizontal and vertical extents of the character. The contents of bounding box 38 are mapped via a linear transformation to the unit square 34 to produce a normalized trajectory 40 having standard dimensions. The set of reference points 32 are assigned along the normalized trajectory 40 such that adjacent reference points are separated by a substantially equal length of the normalized trajectory to provide a representative sampling along the length of the normalized trajectory. It will be appreciated that each reference point will have associated horizontal and vertical coordinates within the unit square 34, and can thus be readily compared to a corresponding reference point on second normalized trajectory (not shown) to quantify the similarity of the normalized trajectory 40 to the second normalized trajectory.

Figure 3:
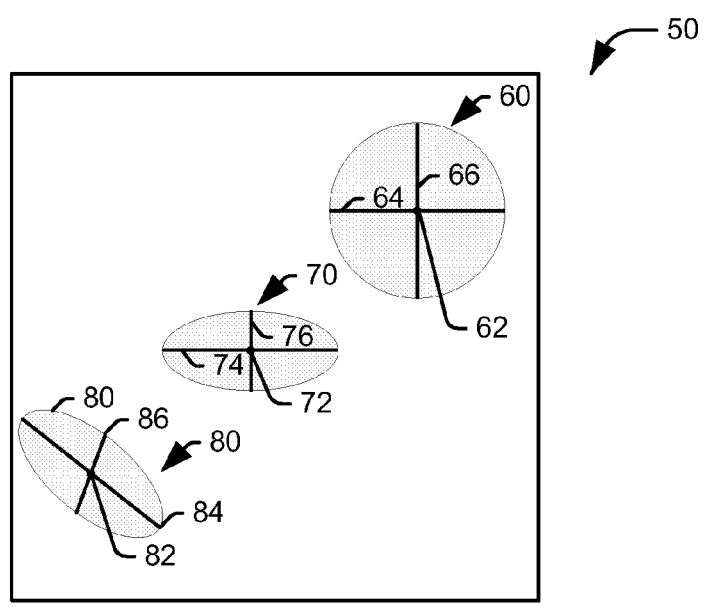
FIG. 3 illustrates an exemplary two-dimensional feature space comprising a plurality of authentication regions for an authorized user defined within the feature space in accordance with an aspect of the present invention.

FIG. 3 illustrates an exemplary two-dimensional feature space 50 comprising a plurality of authentication regions 60, 70, and 80 for an authorized user defined within the feature space. It will be appreciated that for the purpose of illustration, the feature space is defined as two-dimensional, and each authentication region 60, 70, and 80 represents expected values for the location of one of the set of reference points. It will be appreciated, however, that a given authentication region can be defined in three or more dimensions and represent more than one point from the set of reference points, with the feature space associated with authentication region having a dimension representing each coordinate dimension of its associated reference points. For example, an authentication region representing two reference points defined in three-dimensions would be defined in a six-dimensional feature space. Each authentication region is defined by descriptive statistics produced from a set of training data taken from an authorized user. From this training data, respective mean and variance values for the coordinates of each reference point, as well as various covariance values between coordinates defining the same point and coordinates defining different points can be determined. The position and shape of each authentication region can be defined from these descriptive statistics.

In the illustrated feature space 50, a first authentication region 60 represents a first reference point from a set of reference points. A centroid 62 of the region is defined as the mean value of each of the coordinates associated with the region in the training data associated with the user. The variance of the training data along each coordinate dimension defines an extent of the region in the associated dimension of the feature space. In the illustrated implementation, the variance associated with the horizontal coordinate of the reference point is represented by a first axis 64 of the ellipse, and the variance associated with a vertical coordinate of the reference point is represented by a second axis 66 of the ellipse. In the illustrated example, the horizontal and vertical coordinates of the feature point associated with the first authentication region 60 are illustrated as independent and roughly equal in variance, such that the authentication region is approximately circular.

A second authentication region 70 represents a reference point for which the horizontal and vertical coordinates are independent, but the variance of the vertical coordinate is significantly less than the variance of the horizontal coordinate. Accordingly, the elliptical authentication region 70 is narrowed in the vertical dimension, such that the variance of the horizontal coordinate of the reference point around a centroid 72 is represented by a major axis 74 of the ellipse, and the variance of the vertical coordinate around the centroid is represented by a minor axis 76 of the ellipse. A third authentication region 80 represents a similar situation to the second authentication region 70, with the variance of the vertical coordinate being less than the variance of the horizontal coordinate. Accordingly, the variance of the horizontal coordinate of the reference point around a centroid 82 is represented by a major axis 84 of the ellipse, and the variance of the vertical coordinate around the centroid is represented by a minor axis 86 of the ellipse. Unlike the second authentication region 70, however, the horizontal coordinate and the vertical coordinate of the reference point represented by the third authentication region 80 do not vary independently, and thus have a non-zero covariance. This covariance between the variables is represented by an inclination of the elliptical authentication region relative to a horizontal axis of the feature space. In more complex authentication regions, representing multiple reference points and their associated coordinates, the covariance among variables can cause similar distortions in the shape and orientation of a given authentication region that is unique to the authorized user, making it difficult for an unauthorized user to mimic a characteristic gesture of the authorized user.

Figure 4:
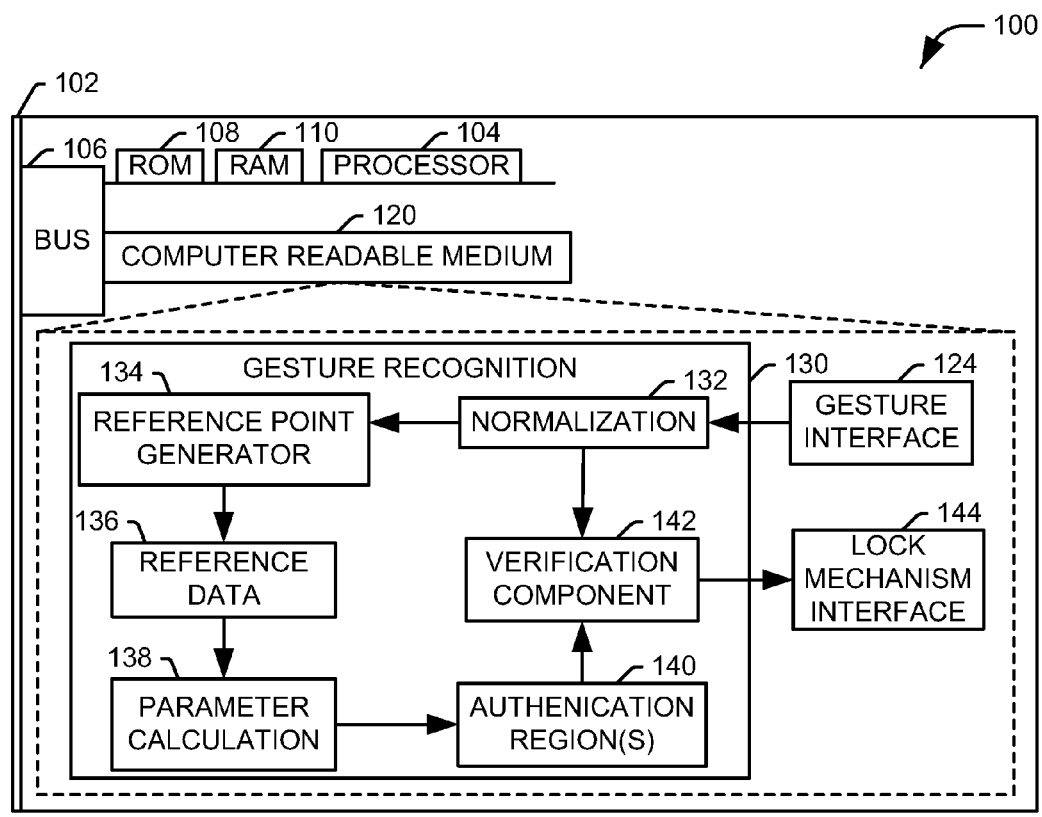
FIG. 4 illustrates an exemplary implementation of an access restriction system utilizing a gesture recognition system to restrict access to an item of interest in accordance with an aspect of the present invention.

FIG. 4 illustrates an exemplary implementation of an access restriction system 100 utilizing a gesture recognition system to restrict access to an item of interest. The access restriction system 100 includes a touch screen 102 that is configured to allow a user to input a characteristic gesture into the device, for example, with the user's finger or via a handheld stylus. The touch screen 102 is connected to at least one processor 104 of the access restriction system 100 via a system bus 106 that carries data among the various components of the access restriction system. The processor 104 can be operatively connected to a read only memory (ROM) 108 and a random access memory (RAM) 110 that serves as a working memory for the processor. A basic input/output system (BIOS) can reside in the ROM 118, generally containing the basic routines that help to transfer information between elements within the access restriction system 100, for example, during a reset or power-up.

The processor 114 can be configured to execute computer executable instructions stored in an associated computer readable medium 120. The computer readable medium 120 can include any medium configured to be reasonably read and executed by a computer system to perform functions from various sets of executable instructions encoded on the medium. Thus, it will be appreciated that the term "computer readable medium" is specifically intended to be interpreted broadly encompass, for example, optical, solid state, and magnetic storage media, but is specifically intended to exclude non-functional listings of computer code. The computer readable medium can store a gesture input interface 124 that allows for trajectory information provided by the user to be converted to a series of coordinate points that can be interpreted by the access restriction system 100 to discern the user's intent. For example, a given gesture is defined by a sequence of points beginning with a point at which the stylus is first detected as contacting the touch sensitive surface and ending with the point at which the stylus is last detected as contacting the touch screen 102. The intermediary points define a piecewise linear trajectory. The number and spacing of the points are determined by the sampling rate of the touch screen 102.

The computer readable medium 120 can further store a gesture recognition system 130 in accordance with an aspect of the present invention. The gesture recognition system 130 can include a normalization element 132 that applies a linear combination to the sequence of points to minimize the effects of variations in scale and aspect. Specifically, a series of points representing a trajectory input by a user can be mapped from an associated bounding box of the trajectory to a standard unit square, such that the user provided trajectory is expanded or contracted in each dimension to a standard size. A reference point generator 134 defines a plurality of reference points to represent the mapped trajectory. Specifically, the plurality of points defining the trajectory, which are generally unevenly spaced along the trajectory due to variations in the user stylus speed and the sampling rate of the touch screen, are replaced by a sequence of reference points that are substantially evenly spaced along the trajectory. For example, the reference points can be assigned by determining a total length of the trajectory, dividing the total length by a value one greater than the desired number of reference points to provide a segment length, and assigning the reference points as to divide the trajectory into a plurality of segments that each have a length approximately equal to the segment length. Each reference point can be defined as a horizontal coordinate and a vertical coordinate within the unit square.

During training, a user can enter the characteristic gesture a number of times. The reference point generator 134 can calculate values for a set of reference points for each of the instances of the characteristic gesture and store the values for the reference points as reference data 136 for the user. This reference data 136 can be provided to a parameter calculation component 138 that calculates representative statistics across the plurality of trajectories comprising the reference data. Accordingly, for each reference point, there are a plurality of values for coordinate pairs available from the plurality of trajectories. From this data, a mean and variance of the horizontal and vertical coordinates of each reference point, as well as a covariance between the horizontal and vertical coordinates, can be determined. In one implementation, covariance values between coordinates for different reference points can also be determined. From these values, one or more authentication regions 140 can be defined in respective feature spaces. Each authentication region is defined within a multidimensional feature space having dimensions corresponding to the coordinates associated with each of one or more points associated with the authentication region. For example, an authentication region can be defined with a mean value for the two dimensions represented as a centroid of the region, the variance of each coordinate defining the extent of the region in an associated dimension, and the covariance between various coordinates determining an associated shape and orientation of the region. The region can be defined mathematically as the set of all points, $\vec{p}$, in the multidimensional feature space having a Mahalanobis distance less than a threshold value from the mean point of the region, such that the following is true:

$$T \geq (\vec{p}-\vec{r})^T \Sigma^{-1} (\vec{p}-\vec{r}) \qquad \text{Eq. 1}$$

where $\vec{r}$ is a position in feature space representing a mean value of all of the coordinate values representing in the feature space, T is a constant threshold value for a covariance weighted distance from $\vec{r}$, and $\Sigma^{-1}$ is the inverse of a covariance matrix defined from the variance and covariance values for the various coordinates represented by the authentication region.

During operation, a gesture is performed by a user and reduced to coordinate values for the plurality of reference points as described above. At a verification component 142, it is determined if the plurality of values for the reference points from the acquired gesture fall within the one or more defined authentication regions. For example, the coordinate values for the plurality of reference points can be divided into one or more feature vectors corresponding to the one or more authentication regions, and it can be determined how which of these feature vectors fall within the defined authentication region within its associated feature space. It will be appreciated that for some applications, a user can be authenticated even when less than all of the feature vectors fall within their associated authentication region. For example, each feature vector can be assigned an associated value, and the user can be authenticated when the total value associated with the feature vectors falling within their associated regions exceeds a threshold value. In one implementation, each reference point is represented by its own authentication region, and the feature vector for each reference point is weighted equally. The result from the verification component 142 can then be provided to a lock mechanism interface 144 that controls a locking mechanism associated with the item of interest. For example, a doorway or access panel secured by an electronic lock can be unlocked via a digital signal from the lock mechanism interface 142 in response to a recognized gesture from an authorized user. Similarly, the lock interface mechanism interface 142 can provide an encrypted authorization code to a computer program, either local or remote, to allow the user access to a computer system, program, or account.

Figure 5:
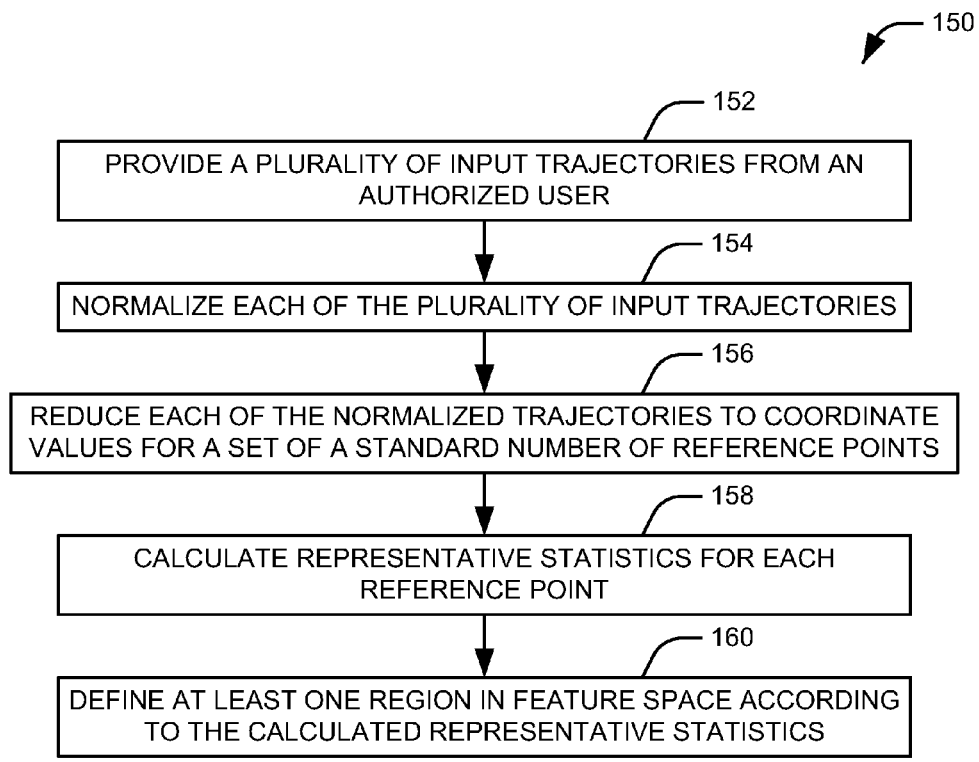
FIG. 5 illustrates an exemplary methodology for training a gesture recognition system for verifying an authorized user in accordance with an aspect of the present invention.
Figure 6:
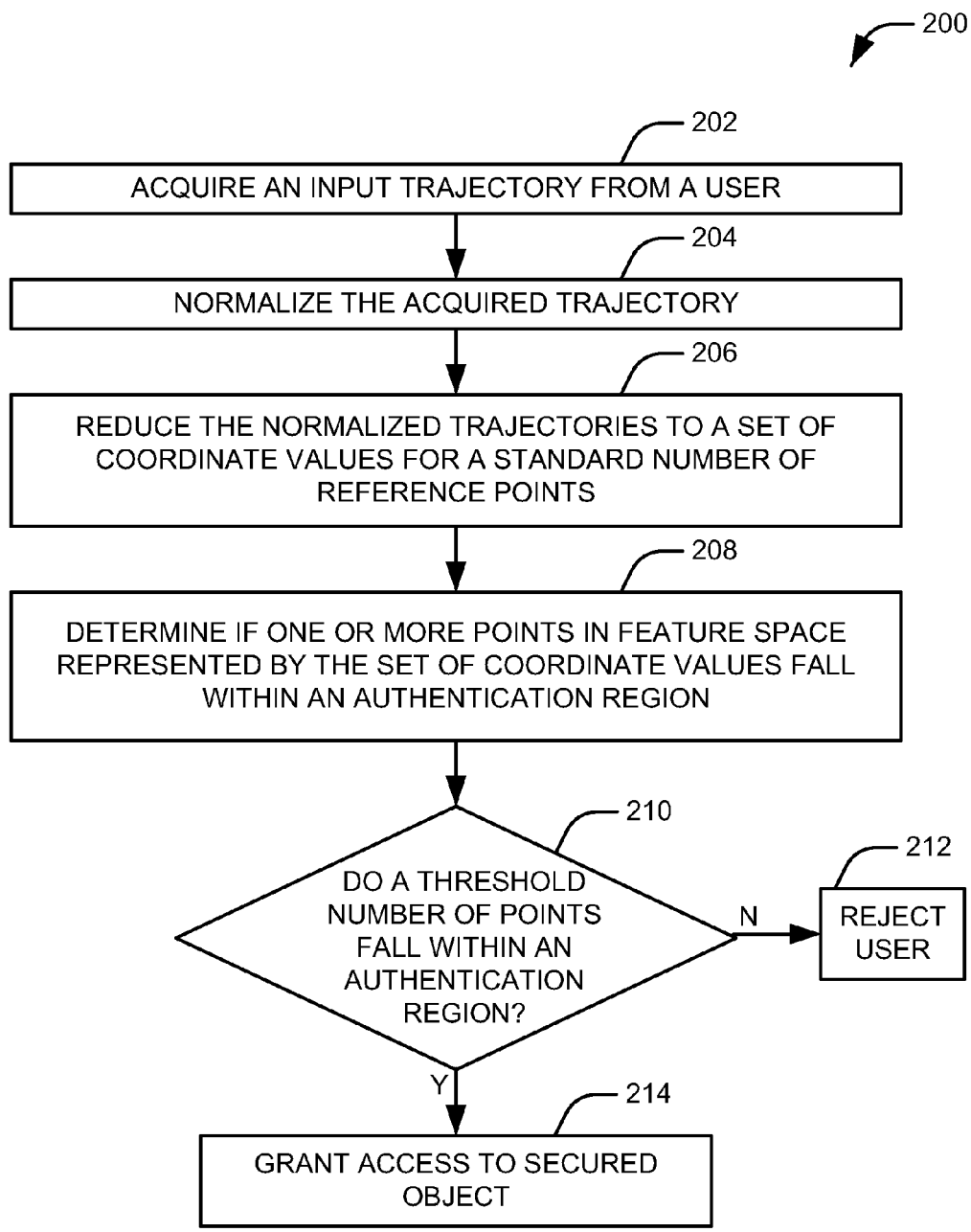
FIG. 6 illustrates a methodology for selectively granting access to an item of interest according to a gesture recognition process in accordance with an aspect of the present invention.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an exemplary methodology 150 for training a gesture recognition system for verifying an authorized user in accordance with an aspect of the present invention. At 152, a plurality of input trajectories representing a characteristic gesture are acquired from a user. At 154, each of the acquired input trajectories is normalized to a standard set of dimensions. In one implementation, a bounding box is defined around each trajectory, and the contents of the bounding box can be mapped to the unit square via a linear transformation. Each of the normalized characters can be reduced to coordinate values for a set of a standard number of reference points at 156. The reference points are selected to divide the normalized character into a plurality of segments of even length, such that the reference points are evenly spaced along the normalized trajectory. Accordingly, each of the plurality of trajectories should be represented by corresponding reference points in substantially similar positions on the trajectory.

At 158, representative statistics for the plurality of input trajectories can be calculated. For example, the data for the user can include multiple coordinate values for each of the reference points from the plurality of acquired trajectories. From this data, a mean horizontal coordinate and a mean vertical coordinate can be calculated for each of the plurality of reference points across the plurality of acquired trajectories. Similarly, a variance of the horizontal and vertical coordinates for a given reference point can be calculated across the plurality of acquired trajectories, and covariance values for the horizontal and vertical coordinates for each point and among points can be determined. At 160, one or more authentication regions can be defined in respective feature spaces. Each authentication region is defined within a multidimensional feature space having dimensions corresponding to the coordinates associated with each of one or more points associated with the authentication region. For example, an authentication region can be defined with a mean value for the two dimensions represented as a centroid of the region, the variance of each coordinate defining the extent of the region in an associated dimension, and the covariance between various coordinates determining an associated shape and orientation of the region. By shaping the regions to incorporate the covariance into the analysis, it is possible to reliably account for the characteristic uncertainty that is expected for a given user between multiple performances of a particular gesture.

FIG. 6 illustrates a methodology 200 for selectively granting access to a item of interest according to a gesture recognition process in accordance with an aspect of the present invention. At 202, an input trajectory representing a characteristic gesture is received from a user. For example, the trajectory can be received by tracking a stylus on a touch screen or track the movement of a user within a designated region, and reduced into a continuous line of points defining the input trajectory. At 204, the input trajectory is normalized to a standard set of dimensions. For example, the points comprising the trajectory can be enclosed by a bounding box, and the contents of the bounding box can be resampled via a linear transformation to fit a unit square of standard size.

At 206, the normalized trajectory is reduced to respective coordinate values for a standard number of substantially evenly spaced points. Each of these points has an associated first coordinate and a second coordinate within the bounding box, for example, a horizontal and a vertical coordinate. Accordingly, the resampled trajectory can be reduced to n evenly spaced points defined by 2n coordinates, and a given trajectory can be conceptualized as a defined point in a 2n-dimensional feature space, or as multiple points within respective feature spaces have less than 2n dimensions. Each of the one or more feature spaces can include an associated authentication region defined within the feature space according to known tendencies of an authorized user. At 208, it is determined if the one or more points in feature space defined by the coordinate values fall within respective authentication regions in their associated feature space. Essentially, it is determined if the input falls within normal parameters for input from an authorized user.

At 210, it is determined if a threshold number of defined points in feature space from the input fall within an authentication region. The threshold number will vary with the application, and it will be appreciated that the threshold value can be all of the points. Where only one feature space is utilized, and a point representing the entire input is compared to a single authentication region, clearly, the threshold will be one. If the number of matching points is less than the threshold value, the user is rejected at 212. If the number of matching points achieves the threshold value, the user is authenticated and access to the item of interest is granted at 214.

Figure 7:
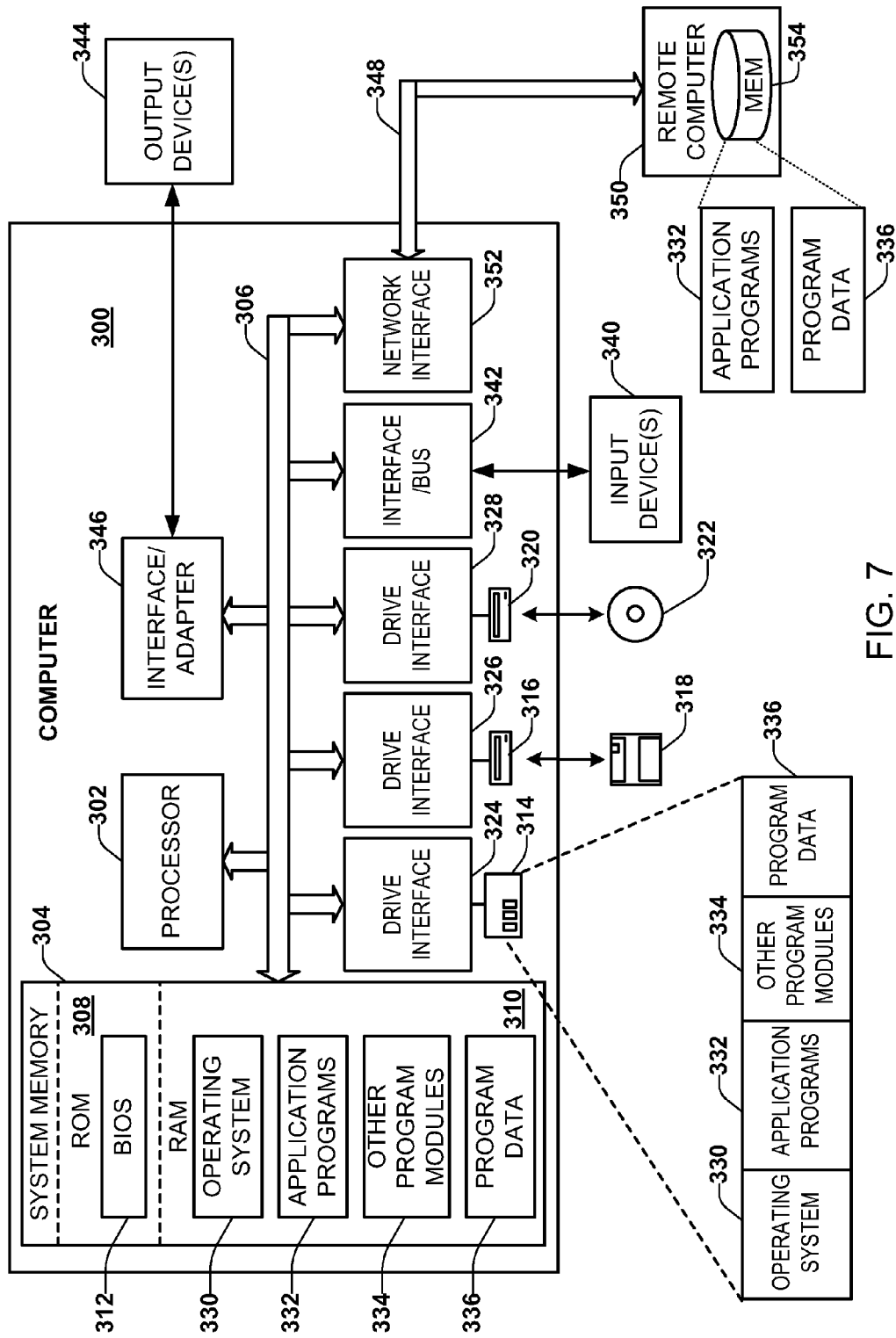
FIG. 7 illustrates a computer system that can be employed to implement systems and methods described herein, such as based on computer executable instructions running on the computer system.

FIG. 7 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336, such as the gesture recognition utilized as an aspect of the present invention.

A user may enter commands and information into the computer system 300 through user input device 340 for recording user gestures, such as a pointing device (e.g., a mouse), a touch screen, or one or more cameras. Other input devices may include a keyboard, a microphone, a joystick, a game pad, a scanner, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A security system for restricting access to an item of interest, comprising:
    a gesture input interface configured to convert a continuous gesture from a user into an input trajectory;
    a normalization component configured to resample the input trajectory to produce a resampled trajectory having a standard size;
    a reference point generator configured to reduce the resampled trajectory to respective values for a set of reference points, each of the values for the set of reference points having at least two associated coordinates;
    at least one authentication region, each of the at least one authentication region representing at least one of the set of reference points, such that each authentication region is defined within a multidimensional feature space having dimensions corresponding to the at least two coordinates associated with each of the at least one points associated with the authentication region from respective sets of representative statistics for the at least one of the set of reference points represented by the authentication region;
    a verification component configured to determine if the values for the set of reference points from a given input falls within the at least one authentication region;
    an access restriction mechanism configured to restrict access to the item of interest unless a threshold number of values for the set of reference points from the input falls within their associated authentication regions; and
    a parameter calculation component configured to receive training data representing a characteristic gesture for the user, the characteristic gesture comprising values for the set of reference points generated by the normalization component and the reference point generator and derived from a user input at the gesture input interface, the parameter calculation component being further configured to calculate a respective one of the sets of representative statistics for each of the set of reference points, the respective one of the sets of representative statistics comprising a mean value for each of the at least two associated coordinates, a variance value for each of the at least two associated coordinates, and a covariance between a first coordinate and a second coordinate of the at least two associated coordinates.

2. The system of claim 1, wherein the at least one authentication region comprises only one authentication region defined within a multidimensional feature space having dimensions corresponding to the at least two coordinates associated with each point, the verification component being configured to determine if a feature vector representing a given input trajectory falls within the authentication region.

3. The system of claim 1, wherein the at least one authentication region comprises an associated authentication region for each of the set of reference points, each authentication region being defined within a multidimensional feature space having dimensions corresponding to the at least two coordinates associated with each point, the verification component being configured to determine if respective feature vectors representing each reference point from a resampled trajectory falls within its associated authentication region.

4. The system of claim 1, the item of interest comprising a credit card account.

5. The system of claim 1, the access restriction mechanism comprising a set of executable instructions, stored on a computer readable medium, that can be executed by a computer to restrict access to an instance of a computer program.

6. The system of claim 1, the item of interest comprising a computer system.

7. The system of claim 1, the gesture input interface comprising at least one camera operating in one of the visible and infrared spectra that track the movement of a user within a designated region.

8. The system of claim 1, the gesture input interface comprising a touch pad that is configured to track the position of an input device in contact with the touch pad.

9. The system of claim 1, wherein the item of interest is an entryway, and the access restriction mechanism is an electronic lock.

10. A method for training a gesture based security system, comprising:
- generating a plurality of input trajectories from a user representing a characteristic gesture for the user;
- normalizing the plurality of input trajectories to produce a set of normalized trajectories having a standard set of dimensions;
- reducing each normalized trajectory to a standard set of substantially evenly spaced reference points, each reference point having at least two associated coordinates;
- calculating representative statistics for each of the reference spaced points across the plurality of input trajectories to provide a mean for each of the at least two associated coordinates associated with the point, a variance for each of the at least two associated coordinates, and a covariance between at least a first of the at least two coordinates and a second of the at least two coordinates; and
- defining respective authentication regions in at least one feature space defined by the associated coordinates of the set of reference points as an authentication range for inputs from the user, the respective authentication regions for the at least one feature space each having at least one associated point from the set of reference points and being defined according to the mean for each of the at least two associated coordinates associated with each of the at least one associated point, a variance for each of the at least two associated coordinates associated with each of the at least one associated point, and a covariance between at least a first of the at least two coordinates and a second of the at least two coordinates associated with each of the at least one associated point.

11. The method of claim 10, wherein receiving an input trajectory representing the characteristic gesture comprises tracking a movement of an input object across a touch screen.

12. The method of claim 10, wherein receiving an input trajectory representing the characteristic gesture comprises tracking the movement of an input object with at least one camera.

13. The method of claim 10, wherein defining a given authentication region of the authentication regions defined in at least one feature space comprises defining a region in feature space in which the Mahalanobis distance between the mean of the region and every point in the region is a threshold value.

14. The method of claim 10, further comprising:
- acquiring a gesture from a user as an input trajectory;
- normalizing the input trajectory to produce a normalized input trajectory having the standard set of dimensions;
- reducing the normalized trajectory to coordinate values for the reference points;
- determining if the coordinate values for the reference points fall within the associated authentication regions; and
- granting access to an item of interest if the coordinate values for the reference points fall within the associated authentication regions.

15. A security system for authenticating a user, comprising:
- an input device configured to convert a gesture by a user into a trajectory representing a motion of the user over time;
- a normalization component configured to resample the trajectory to produce a resampled trajectory having a standard size;
- a reference point generator configured to define a standard number of substantially equidistant reference points on the resampled trajectory, each of the reference points having at least two associated coordinate values;
- a parameter calculation component configured to calculate representative statistics across a plurality of gestures from a user for the reference points, the representative statistics comprising at least one covariance value between a first coordinate and a second coordinate associated with one of the reference points;
- at least one authentication region, each of the at least one authentication region representing at least one of the set of reference points, such that each authentication region is defined within a multidimensional feature space having dimensions corresponding to the at least two coordinates associated with each of the at least one points associated with the authentication region according to the representative statistics for the reference points associated with the authentication; and
- a verification component configured to determine if the coordinate values for the set of reference points from a given input fall within the at least one authentication region.

16. The system of claim 15, further comprising an access restriction mechanism configured to restrict access to the item of interest unless the coordinate values for the set of reference points fall within the at least one authentication region.

17. The system of claim 15, wherein the at least one authentication region comprises only one authentication region defined within a multidimensional feature space having dimensions corresponding to the at least two coordinates associated with each point, the verification component being configured to determine if a feature vector representing a given input trajectory falls within the authentication region.

18. The system of claim 15, wherein the at least one authentication region comprises an associated authentication region for each of the set of reference points, each authentication region being defined within a multidimensional feature space having dimensions corresponding to the at least two coordinates associated with each point, the verification component being configured to determine if respective feature vectors representing each reference point from a resampled trajectory falls within its associated authentication region.

19. The system of claim 15, the item of interest comprising one of an entryway or access panel.

* * * * *